Dec. 21, 1926.  T. H. STRACHAN  1,611,569
WEIGHING SCALE
Original Filed August 1, 1925    2 Sheets-Sheet 1
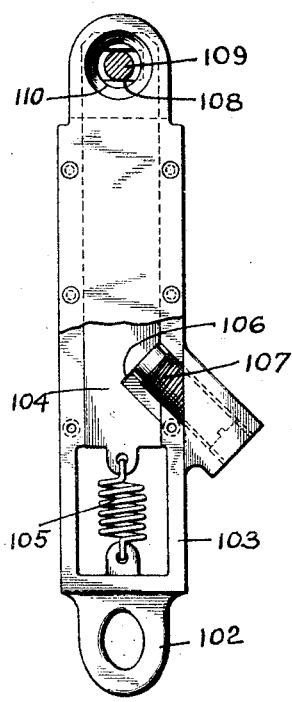
Fig.3.
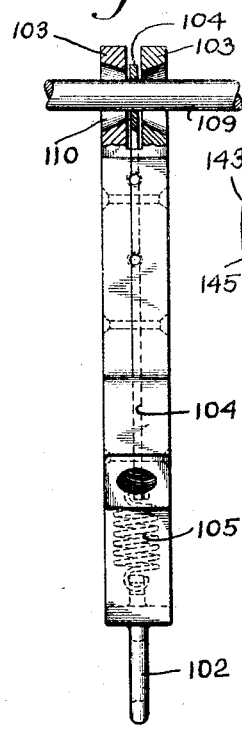
Fig.4.
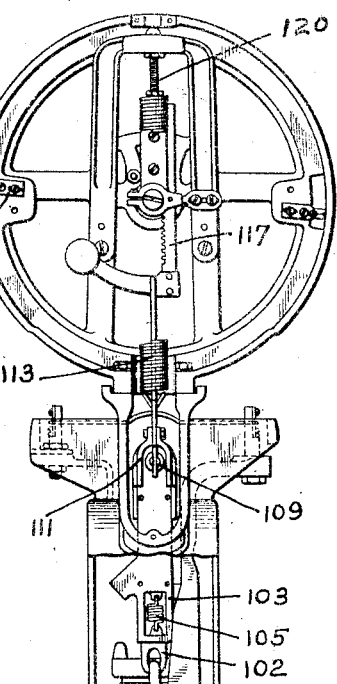
Fig.1.
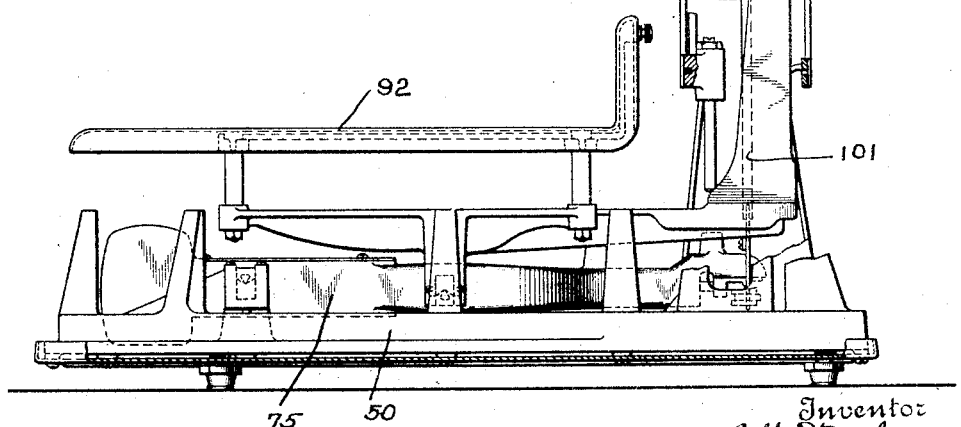
Inventor
T. H. Strachan
By his Attorneys
Cooper, Kerr & Dunham

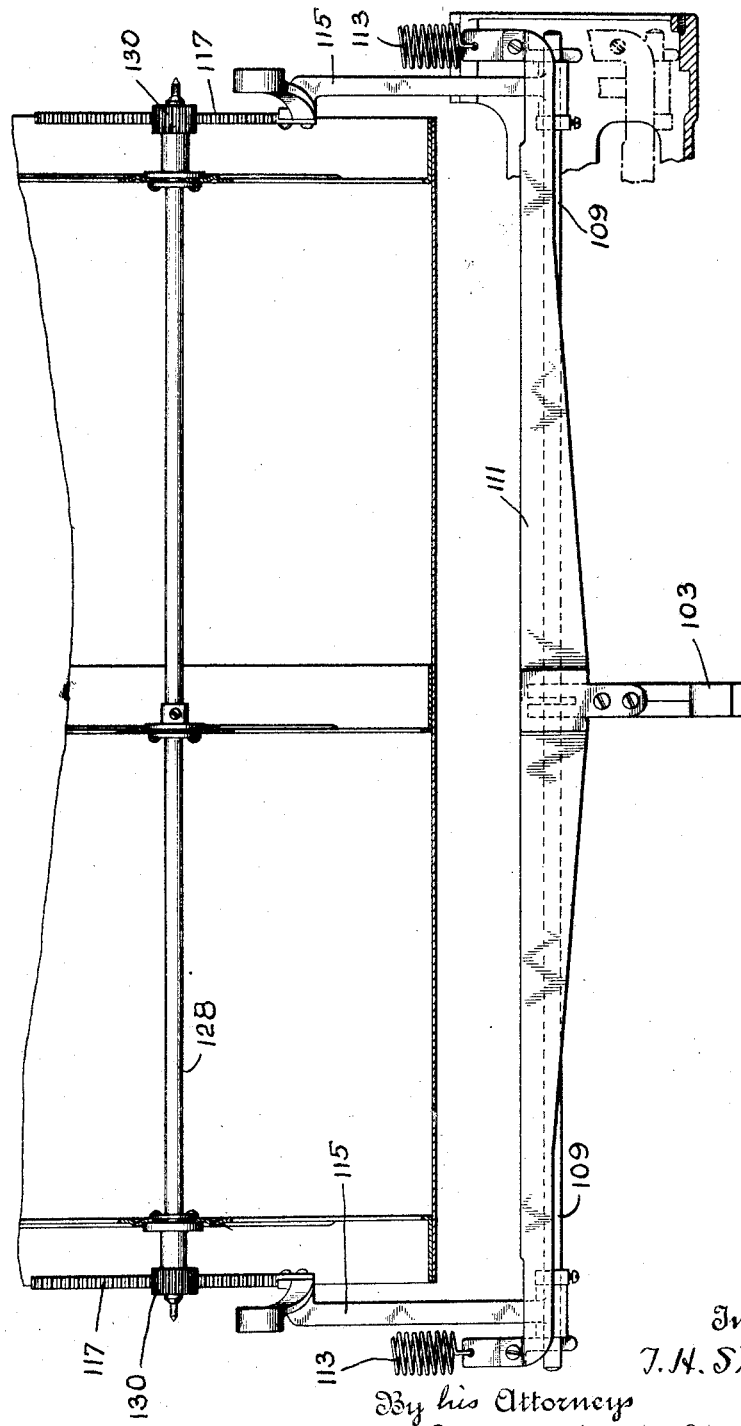

Patented Dec. 21, 1926.

1,611,569

UNITED STATES PATENT OFFICE.

THOMAS HENRY STRACHAN, OF DAYTON, OHIO, ASSIGNOR TO DAYTON SCALE COMPANY, OF DAYTON, OHIO, A CORPORATION OF NEW JERSEY.

WEIGHING SCALE.

Original application filed August 1, 1925, Serial No. 47,472. Divided and this application filed April 14, 1926. Serial No. 101,813.

This invention pertains to weighing scales, being a division of my copending application Serial No. 47,472, filed August 1, 1925, and comprises improvements in zero adjusting devices for such mechanisms.

My present device is particularly useful in scales of the drum type in which there is a load counterbalancing member, such as a spring, together with a chart rotating device, such as a rack and pinion, in each end of the drum.

In a scale of the above type the two counterbalancing members are connected by a horizontal draw bar underneath the drum, and the two racks are connected by an equalizer bar parallel with and adjacent to the draw bar. By interconnecting the draw bar and equalizer bar at their centers with an adjustable device it is possible to move the racks vertically relatively to the springs, thereby providing means for rotating the chart relatively to the fixed portions of the machine for the purpose of adjusting the chart to its zero position.

This invention relates to the above mentioned adjustable device, the principal use of which is to bring the indicator to correct zero position. My device is rugged in construction, easy to adjust, cheap to manufacture, positive in operation, and not subject to inadvertent change of adjustment due to vibration or shock while the scale is in use.

In the drawings,

Fig. 1 is a side view of a drum scale with outer casing removed.

Fig. 2 is a skeleton view of the chart, springs, racks, pinions, draw bar, equalizer bar, and the zero adjusting device, parts of the chart and adjusting device being broken away.

Fig. 3 is a side view of the device, partly in section.

Fig. 4 is a front view of the device, partly in section.

The scale comprises, in general, a base 50 upon which is fulcrumed a base lever 75. Extending upwardly from the free end of lever 75 is the steelyard rod 101 which engages a loop 102 in the lower end of frame 103 of the zero adjusting device. The upper end of frame 103 is fast to the draw bar 111 at the middle of its length.

Slidably mounted in frame 103 is a plate 104 which is constantly urged downwardly by spring 105 connecting the lower end of slide 104 to frame 103. Threaded into the side of frame 103 is the screw 107 inclined upwardly so that its flat inner end bears against the inclined surface or seat 106 of slide 104. When screw 107 is turned out, slide 104 is drawn down by spring 105, seat 106 being kept in contact with the end of screw 107. When the screw is turned in, slide 104 is forced upwardly by the screw against the tension of spring 105. If screw 107 be not moved, slide 104 is held in fixed relation to frame 103 by spring 105 which holds seat 106 against the flat end of the screw.

The upper end of slide 104 is provided with a horizontal slot 108 having rounded edges, through which snugly passes equalizer bar 109. Frame 103 is also apertured at its upper end as at 110, to provided clearance for rod 109, both vertically and laterally. Since frame 103 is fast to draw bar 111 it will be apparent that any vertical movement of slide 104 relative to frame 103 will move bar 109 vertically relatively to bar 111. Bar 111 is channel shaped and overlies and partly surrounds bar 109.

Pivotally connected to the outer ends of bar 109 are the upwardly extending rack bars 115 having on their upper ends racks 117 engaging pinions 130 on chart shaft 128. Supporting the outer ends of draw bar 111 are the load counterbalancing springs 113, fast at their upper ends to screws 120 which in turn are secured to the frame of the machine.

When a load is placed on platform 92, which is supported in the well known manner on lever 75, the free end of lever 75 draws down steelyard rod 101, adjusting frame 103, bar 109, and bar 111 against the resistance of springs 113, thereby rotating chart 126 by means of racks 117 until a position of equilibrium is reached, whereupon the operator may read the indication on the chart by the aid of any adjacent fixed part of the machine, preferably indicator wire 143 which is stretched along the front of the chart but out of contact with it, each end of wire 143 being fast to a clip 145.

If no load is on the scale platfrom the chart should indicate zero. If it does not indicate zero, screw 107 is advanced or withdrawn until the indication is correct, whereupon the scale is ready for use.

The action of screw 107 is communicated to the chart in a manner that will be readily apparent.

When no load is on the platform, springs 113 maintain draw bar 111 in a fixed vertical position and as frame 103 is fast to bar 111, it is also in a fixed vertical position. When screw 107 is turned, plate 104 moves vertically relatively to frame 103, carrying with it equalizer bar 109 and racks 117. Consequently shaft 128 and chart 126 are rotated relatively to the fixed parts of the scale, such as the indicator wire, until the desired position of the chart relatively to the wire is attained.

It is to be understood that the invention is not limited to the specific details herein illustrated and described, but can be embodied in other forms without departure from its spirit.

I claim—

1. A zero adjustment device for a scale adapted to vary the relative position of an equalizer rod and a frame which operates said rod, comprising in combination, a frame having an integral steelyard loop thereon, a plate slidably carried and guided by said frame and slotted to receive an equalizer rod, a spring connected at its ends respectively to said frame and plate and adapted to draw downwardly upon the plate, and an adjustment screw threaded in the frame and bearing at its end upon an angular seat in said plate.

2. A zero adjustment device for varying the relative connection of an equalizer rod and an operating steelyard, said device comprising a frame member, a plate sliding therein and recessed to receive the equalizer, and a spring connecting said plate and frame member, said plate having an angular seat therein and a screw threaded in said frame member and having a flat end bearing against said seat, said screw by in and out adjustment against said seat, affording adjustment for the vertical position of said plate for the purpose described.

3. In a weighing scale, in combination, a movable chart, an immovable member, and a settable device to adjust said chart relatively to said member, said device comprising a frame, a slidable member mounted in said frame and provided with an angular seat, a spring arranged to draw said slidable member downwardly relatively to said frame, and a screw settable in said frame against said seat to move said slidable member in said frame against the action of said spring.

In testimony whereof I hereto affix my signature.

THOMAS HENRY STRACHAN.